(12) United States Patent  
Choi et al.

(10) Patent No.: US 12,369,154 B2
(45) Date of Patent: Jul. 22, 2025

(54) METHOD AND APPARATUS FOR PERFORMING COMMUNICATION FOR TRANSMISSION/RECEPTION OF IAB NODE IN WIRELESS COMMUNICATION SYSTEM

(71) Applicant: Samsung Electronics Co., Ltd., Suwon-si (KR)

(72) Inventors: Seunghoon Choi, Suwon-si (KR); Hyunseok Ryu, Suwon-si (KR); Sungjin Park, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 17/648,169

(22) Filed: Jan. 17, 2022

(65) Prior Publication Data

US 2022/0232604 A1  Jul. 21, 2022

(30) Foreign Application Priority Data

Jan. 18, 2021 (KR) .................. 10-2021-0007108
May 7, 2021 (KR) .................. 10-2021-0059289

(51) Int. Cl.
*H04W 72/20* (2023.01)
*H04W 72/12* (2023.01)
*H04W 88/08* (2009.01)

(52) U.S. Cl.
CPC .......... *H04W 72/20* (2023.01); *H04W 72/12* (2013.01); *H04W 88/085* (2013.01)

(58) Field of Classification Search
CPC .... H04W 72/12; H04W 72/20; H04W 88/085
See application file for complete search history.

(56) References Cited

U.S. PATENT DOCUMENTS

| 2020/0015316 A1* | 1/2020 | Islam ............... H04W 56/0045 |
| 2022/0039038 A1  | 2/2022 | Liu et al. |
| 2023/0188252 A1* | 6/2023 | Peng .................... H04L 1/0025 370/329 |

(Continued)

FOREIGN PATENT DOCUMENTS

| WO | 2020064027 A2 | 4/2020 |
| WO | 2020198003 A1 | 10/2020 |
| WO | 2020198430 A1 | 10/2020 |

(Continued)

OTHER PUBLICATIONS

International Search Report and Written Opinion of the International Searching Authority in connection with International Application No. PCT/KR2022/000827 issued Apr. 20, 2022, 8 pages.

(Continued)

*Primary Examiner* — Saad A. Waqas

(57) ABSTRACT

Provided is a method and apparatus of IAB node for efficient transmission/reception in a wireless communication system is provided, the IAB node including an IAB-MT used to connect with a parent IAB node and a IAB-DU used to connect with a child IAB node, the method comprises transmitting, to the child IAB node, first information indicating a timing scheme to be applied for the IAB node, and in case that the indicated timing scheme is a first timing scheme, receiving, from the child IAB node, a signal, based on the indicated timing scheme.

18 Claims, 10 Drawing Sheets

(56) References Cited

U.S. PATENT DOCUMENTS

2023/0276389 A1* 8/2023 Ko .................. H04W 56/0005
370/350

FOREIGN PATENT DOCUMENTS

WO  2021006320 A1  1/2021
WO  WO-2021162465 A1 *  8/2021  ........ H04W 56/0015

OTHER PUBLICATIONS

Qualcomm Incorporated, "On enhancements for simultaneous operation of IAB-nodes child and parent links," R1-2009270, 3GPP TSG RAN WG1 Meeting #103-e, Oct. 26-Nov. 13, 2020, 12 pages.
Huawei et al., "Enhancements for simultaneous operation of MT and DU," R1-2007595, 3GPP TSG RAN WG1 Meeting #103-e, E-meeting, Oct. 26-Nov. 13, 2020, 11 pages.
3GPP TS 38.321 V16.3.0 (Dec. 2020) Technical Specification; 3rd Generation Partnership Project; Technical Specification Group Radio Access Network; NR; Medium Access Control (MAC) protocol specification (Release 16); 154 pages.
Supplementary European Search Report dated Jun. 3, 2024, in connection with European Patent Application No. 22739813.8, 12 pages.

* cited by examiner

METHOD AND APPARATUS FOR PERFORMING COMMUNICATION FOR TRANSMISSION/RECEPTION OF IAB NODE IN WIRELESS COMMUNICATION SYSTEM

CROSS-REFERENCE TO RELATED APPLICATION

This application is based on and claims priority under 35 U.S.C. § 119 to Korean Patent Application No. 10-2021-0007108, filed on Jan. 18, 2021, and Korean Patent Application No. 10-2021-0059289, filed on May 7, 2021, in the Korean Intellectual Property Office, the present disclosure of which is incorporated by reference herein in its entirety.

BACKGROUND

1. Field

The present disclosure relates to a wireless communication system, and more particularly, to a method and apparatus for performing communication in an integrated access and backhaul (IAB) node.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.)

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Accordingly, various attempts are being made to apply the 5G communication system to IoT. For example, 5G communication technologies such as sensor networks, M2M, and MTC are implemented by techniques including beamforming, MIMO, and array antenna. Application of a cloud RAN as the big data processing technology described above may be considered to be an example of convergence between the 5G technology and the IoT technology.

Recently, various studies have been made to utilize integrated access and backhaul (IAB) technology, and accordingly, there is a need for improving dual access of an IAB node.

SUMMARY

Provided are a communication method and apparatus for efficient transmission/reception of an integrated access and backhaul (IAB) node in a wireless communication system.

Provided are a communication method and apparatus for efficient transmission/reception of an IAB node which is a radio access network (RAN) node supporting a new radio (NR) backhaul link for an IAB node, different from an NR access link for a user equipment (UE) in a wireless communication system.

Provided are a communication method and apparatus in a wireless communication system, in which a distributed unit (DU) and a mobile termination (MT) included in an IAB node simultaneously receive signals from a parent IAB node or a child IAB node, respectively.

Provided are a communication method and apparatus of an IAB node in a wireless communication system, which facilitate interference cancellation in a DU and an MT of an IAB node, when the DU and the MT of the IAB receive signals simultaneously in different resources from a parent IAB node or a child IAB node.

Provided are a communication method and apparatus in a wireless communication system, which align slot timings between a DU and an MT of an IAB node during signal receptions of the DU and the MT.

Additional aspects will be set forth in part in the description which follows and, in part, will be apparent from the description, or may be learned by practice of the presented embodiments of the present disclosure.

According to an embodiment of the present disclosure, a method of IAB node in a wireless communication system is provided, the IAB node including a IAB-MT used to connect with a parent IAB node and a IAB-DU used to connect with a child IAB node, the method comprises transmitting, to the child IAB node, first information indicating a timing scheme to be applied for the IAB node, and in case that the indicated timing scheme is a first timing scheme, receiving, from the child IAB node, a signal, based on the indicated timing scheme.

In addition, according to an embodiment of the present disclosure, an IAB node in a wireless communication system is provided, the IAB node including a IAB-MT used to connect with a parent IAB node and a IAB-DU used to connect with a child IAB node, the IAB node comprises at least one transceiver, and a controller coupled with the at least one transceiver and configured to transmit, to the child IAB node, first information indicating a timing scheme to be applied for the IAB node, and in case that the indicated timing scheme is a first timing scheme, receive, from the child IAB node, a signal, based on the indicated timing scheme.

In addition, according to an embodiment of the present disclosure, a method of a child IAB node connected with a IAB node in a wireless communication system is provided, the child IAB node including a IAB-MT used to connect with to IAB node, the method comprises receiving, from the IAB node, first information indicating a timing scheme to be applied for the IAB node, and in case that the indicated timing scheme is a first timing scheme, transmitting, by the IAB-MT in the child IAB node, the signal to the IAB node based on the indicated timing scheme.

In addition, according to an embodiment of the present disclosure, a child IAB node connected with a IAB node in a wireless communication system is provided, the child IAB node including a IAB-MT used to connect with to IAB node, the child IAB node comprises at least one transceiver, and a controller coupled with the at least one transceiver and configured to receive, from the IAB node, first information indicating a timing scheme to be applied for the IAB node, and in case that the indicated timing scheme is a first timing scheme, transmit, by the IAB-MT in the child IAB node, a signal to the IAB node based on the indicated timing scheme.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
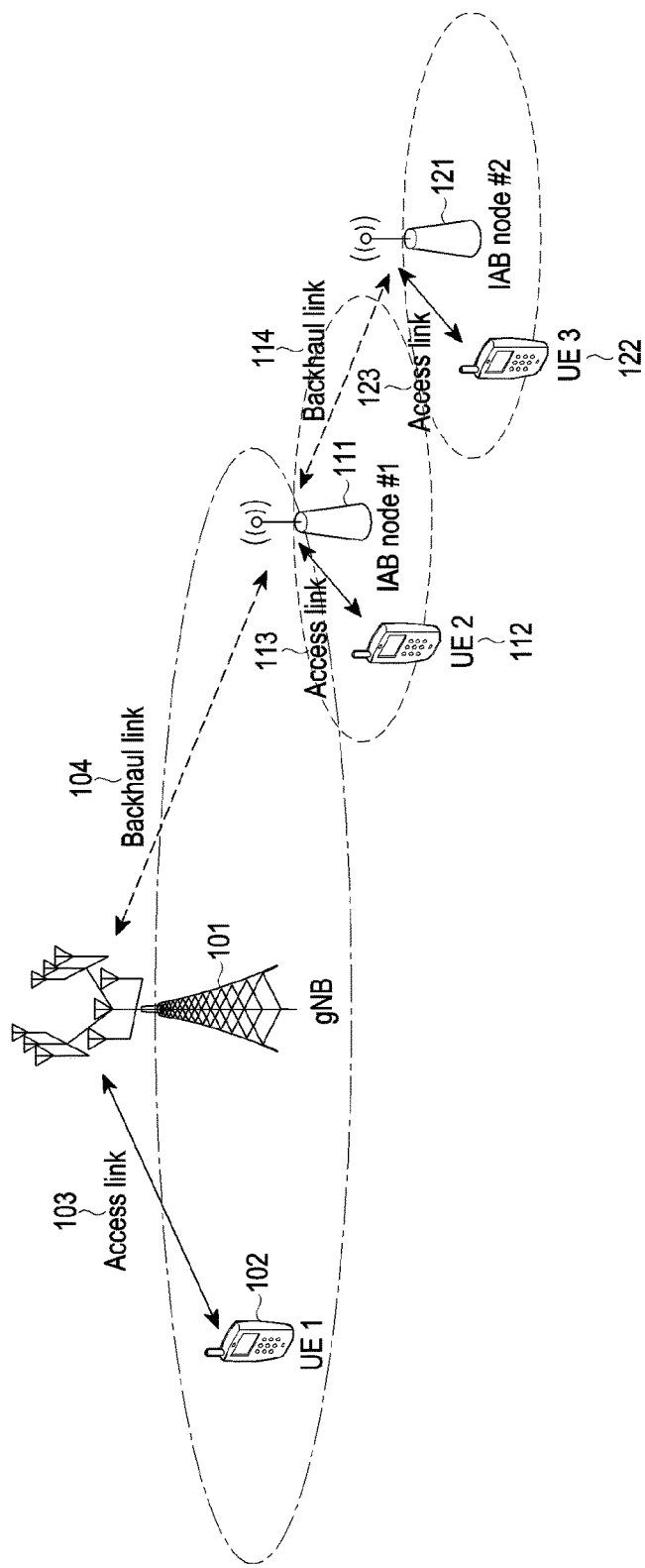
FIG. 1 is a diagram illustrating an exemplary wireless communication system in which an integrated access and backhaul (IAB) node operates.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Preferred embodiments of the present disclosure are described below in detail with reference to the accompanying drawings. It is to be noted that like reference numerals denote the same components, if possible. Lest it should obscure the subject matter of the present disclosure, a detailed description of functions and constructions known in the art will be avoided.

In describing embodiments herein, techniques which are known in the technical field of the present disclosure and are not directly related to the present disclosure will not be described. This is intended to clearly convey the subject matter of the present disclosure without obscurity by avoiding an unnecessary description.

For the same reason, some components shown in the drawings are exaggerated, omitted, or schematically illustrated, and the drawn size of each component does not exactly reflect its real size. In each drawing, the same reference numerals are assigned to the same or corresponding components.

The advantages and features of the present disclosure, and a method of achieving them will become apparent from reference to embodiments described below in detail in conjunction with the attached drawings. However, the present disclosure may be implemented in various manners, not limited to the embodiments set forth herein. Rather, these embodiments are provided such that the present disclosure is complete and thorough and its scope is fully conveyed to those skilled in the art, and the present disclosure is only defined by the appended claims. The same reference numerals denote the same components throughout the specification.

It will be understood that each block of the flowchart illustrations and/or block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions/acts specified in the flowchart and/or block diagram block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function/act specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units." In addition, the components and "units" may be implemented such that they are executed on one or more central processing units (CPUs) in a device or a secure multimedia card.

Beyond the initial voice-centered services, wireless communication systems have been developed to provide high-speed, high-quality packet data services, such as communication standards including, for example, high speed packet access (HSPA), long term evolution (LTE) (or evolved universal terrestrial audio access (E-UTRA)), LTE-advanced (LTE-A), and LTE-Pro of the 3rd generation partnership project (3GPP), and high rate packet data (HRPD), ultra mobile broadband (UMB), and institute of electrical and electronics engineers (IEEE) 802.16e.

The LTE system, which is a major example of the wideband wireless communication systems, adopts orthogonal frequency division multiplexing (OFDM) for downlink (DL) and single carrier frequency division multiple access (SC-FDMA) for uplink (UL). A UL refers to a radio link on which a user equipment (UE) (terminal or mobile station (MS)) transmits data or a control signal to a next generation Node B (gNB) (or eNode B or base station (BS)), and a DL refers to a radio link on which a gNB transmits data or a control signal to a UE. In the multiple access scheme, data or control information for different users are distinguished from each other by allocating and managing time-frequency resources without overlap, that is, with orthogonality between them, for transmission of the data or the control information for the users.

Because a beyond LTE communication system, that is, a 5th generation (5G) (or new radio (NR)) system may freely reflect various requirements from users and service providers, services satisfying the various requirements simultaneously may be supported. Services considered for the 5G communication system include enhanced mobile broadBand (eMBB), massive machine type communication (mMTC), and ultra reliability low latency communication (URLLC).

eMBB aims to provide much higher data rates than those supported by legacy LTE, LTE-A, or LTE-Pro. For example, the 5G communication system may be able to provide up to 20 Gbps on DL and up to 10 Gbps on UL, from the perspective of a single gNB. Besides the maximum data rates, the 5G communication system may provide an increased user-perceived data rate. To satisfy these requirements, various transmission and reception techniques need to be advanced, including multiple input multiple output (MIMO). While a signal is transmitted in a transmission bandwidth of up to 20 MHz at 2 GHz used in the current LTE, a wider frequency bandwidth than 20 MHz at 3 to 6

GHz or above 6 GHz is used in the 5G communication system, thereby satisfying the data rates required in the 5G communication system.

Further, mMTC is considered to support an application service such as Internet of Things (IoT) in the 5G communication system. For efficient IoT, mMTC requires support of access from a large number of UEs within a cell, advanced coverage of UEs, an increased battery lifetime, and cost reduction of the UEs. IoT devices execute a communication function by being attached to various sensors and devices, and thus may be able to support a huge number of UEs (e.g., 1,000,000 UEs/km2). Further, because an mMTC-enabled UE is highly likely to be placed in a shadowing area which is not covered by a cell, such as the basement of a building, in view of the nature of the service, the mMTC-enabled UE requires wider coverage than in other services. The mMTC-enabled UE may be a low-price one and have a very long battery lifetime such as 10 to 15 years because a battery of the mMTC-enabled UE is difficult to often replace.

Finally, URLLC is a mission-critical cellular-based wireless communication service. For example, URLLC may be considered as a service used for remote control of robots or machinery, industrial automation, unmanned aerial vehicles, remote health care, and emergency alert. Accordingly, URLLC may provide communication with a very low latency and very high reliability. For example, a service supporting URLLC may satisfy an air interface latency less than 0.5 milliseconds and has a packet error rate requirement of 10-5 or less. Therefore, for a service supporting URLLC, the 5G system may be designed to provide a smaller transmission time interval (TTI) than for other services and allocate wide resources in a frequency band to secure the reliability of a communication link.

The three services of 5G, that is, eMBB, URLLC, and mMTC may be multiplexed in a single system. To satisfy different requirements of the services, different transmission and reception techniques and different transmission and reception parameters may be used for the services.

In the 5G system, when a gNB transmits and receives data to and from a UE in the above 6 GHz band, particularly the millimeter wave (mmWave) band as well as 3 to 6 GHz band, coverage may be limited due to propagation path attenuation. Although problems caused by the limited coverage may be solved by densely deploying a plurality of relays (or relay nodes) in a propagation path between the gNB and the UE, much cost incurred in installing an optical cable for a backhaul connection between relays becomes a challenging issue. Accordingly, instead of installation of an optical cable between relays, use of wideband radio frequency resources available in mmWave may lead to elimination of the problem of cost in installing an optical cable and more efficient use of the mmWave band.

As described above, a technique of transmitting and receiving backhaul data to and from a gNB and finally transmitting and receiving the data as access data to and from a UE through at least one relay node in mmWave band as well as 3 to 6 GHz band is called integrated access and backhaul (IAB). The relay node that transmits and receives data to and from the gNB through a wireless backhaul is called an IAB node. The gNB (or BS, also called an IAB donor) includes a central unit (CU) and a distributed unit (DU), and the IAB node includes a DU and a mobile termination (MT). The CU manages the DUs of all IAB nodes connected to the gNB over multiple hops.

The IAB node uses different frequency bands or the same frequency band, when receiving backhaul data from the gNB and transmitting access data to the UE, and when receiving access data from the UE and transmitting backhaul data to the BS. When using the same frequency band, the IAB node has a unidirectional transmission/reception property (half-duplex constraint) at one instant. Accordingly, to reduce a transmission/reception delay caused by the unidirectional transmission/reception property of the IAB node, the IAB node may multiplex backhaul data (e.g., on the assumption that a parent IAB node, the IAB node acting as a relay node, and a child IAB node are connected through wireless backhaul links, UL data from the MT of the IAB node to the DU of the parent IAB node and DL data from the DU of the IAB node to the MT of the child IAB node) and access data to a UE (DL data from the IAB node to the UE) (e.g., in frequency division multiplexing (FDM) and/or spatial division multiplexing (SDM)) during transmission. For the relationship between the parent node and the IAB node and the relationship between the child node and the IAB node, 3GPP TS 38.300 integrated access and backhaul may be referred to.

Further, during reception, the IAB node may multiplex backhaul data (DL data from the DU of the parent IAB node to the MT of the IAB node and UL data from the MT of the child IAB node to the DU of the IAB) and access data from the UE (UL data from the UE to the IAB node) (in FDM and/or SDM).

When the MT of the IAB node receives a signal from the DU of the parent IAB node, transmission from the MT of the child IAB node or the access UE to the DU of the IAB node may interfere with the signal reception at the MT of the IAB node. In addition, when the DU of the IAB node receives a signal from the MT of the child IAB node or the access UE, transmission from the DU of the parent IAB node to the MT of the IAB node may interfere with the signal reception at the DU of the IAB node.

To cancel interference during simultaneous receptions at the MT and DU of the IAB node, a method of aligning slot timings between simultaneous receptions at the DU and MT of an IAB node is applied so that interference with reception at the DU of the IAB node may be uniform across all symbols of a DU slot in the present disclosure. Further, interference with reception at the MT of the IAB node may be uniform across all symbols of an MT slot. In this case, since the influence of the interference on the entire DU slot or MT slot is the same, a signal in the slot may be recovered by estimating interference in a specific symbol of the DU slot of the parent IAB node or the MT slot of the child IAB nod and canceling the estimated interference in all symbols of the DU slot of the IAB node or the MT slot of the child IAB node. Accordingly, the present disclosure provides a method of applying the same reception timing according to a unidirectional transmission/reception property in the case of simultaneous receptions as described above, and a related operation of an IAB node.

FIG. 1 is a diagram illustrating an exemplary wireless communication system in which IAB nodes operate.

Referring to FIG. 1, a gNB 101 is a typical BS (e.g., eNB or gNB) and may also be referred to as an eNB, a BS, a donor gNB, or a donor IAB in the present disclosure. A first IAB node (IAB node #1) 111 and a second IAB node (IAB node #2) 121 are IAB nodes that transmit and receive signals on a backhaul link in the mmWave band as well as 3 to 6 GHz band. A first UE (UE 1) 102 transmits and receives access data to and from the gNB 101 on an access link 103. IAB node #1 111 transmits and receives backhaul data to and from the gNB 101 on a backhaul link 104. A second UE (UE 2) 112 transmits and receives access data to and from IAB node #1 111 on an access link 113. IAB node #2 121 transmits and receives backhaul data to and from IAB node #1 111 on a backhaul link 114. Accordingly, IAB node #1 111 is a higher IAB node, also called a parent IAB node for IAB node #2 121, and IAB node #2 121 is a lower IAB node, also called a child IAB node for IAB node #1 111. A third UE (UE 3) 122 transmits and receives access data to and from IAB node #2 121 on an access link 123. In FIG. 1, the backhaul links 104 and 114 may be radio backhaul links.

Now, a description will be given of measurement of an IAB node or a donor gNB at a UE.

To enable UE 2 112 or UE 3 122 to perform measurement on the neighboring donor gNB or IAB node other than the serving IAB node, coordination may be required between the donor gNB and the IAB nodes. That is, the donor gNB may match measurement resources between IAB nodes having even-numbered hop orders or measurement resources between IAB nodes having odd-numbered hop orders, so that the UE may perform measurement on the neighboring IAB node or gNB with minimal resource consumption. The UE may receive configuration information instructing the UE to measure a synchronization signal block (SSB)/physical broadcast channel (PBCH) or a channel state information reference signal (CSI-RS) for measurement of the neighboring IAB node from the serving IAB node or gNB by higher-layer signaling (higher-layer signal).

When the UE is configured to measure the neighboring gNB through the SSB/PBCH (which may also be referred to as "SS/PBCH" or "SSB"), the UE may be configured with two SS/PBCH measurement timing configurations (SMTCs) per frequency, for measurement resources for an IAB node having an even-numbered hop order or an IAB node having an odd-numbered hop order. Upon receipt of the configuration information, the UE may measure the IAB node having the even-numbered hop order in one of the SMTCs, and measure the IAB node having the odd-numbered hop order in the other SMTC.

Measurement of another IAB node at an IAB node or a donor gNB will be described below.

To enable an IAB node to perform measurement on a neighboring donor gNB or IAB node, coordination may be required between the donor gNB and the IAB nodes. That is, the donor gNB may match measurement resources between IAB nodes having even-numbered hop orders or measurement resources between IAB nodes having odd-numbered hop orders, so that the IAB node may perform measurement on the neighboring IAB node or IAB gNB with minimal resource consumption. The IAB node may receive configuration information instructing the IAB node to measure an SS/PBCH or a CSI-RS for measurement of the neighboring IAB node from the serving IAB node or gNB by higher-layer signaling.

When the IAB node is configured to measure the neighboring gNB through the SS/PBCH, the IAB node may be configured with two SMTCs per frequency, for measurement resources for an IAB node having an even-numbered hop order or an IAB node having an odd-numbered hop order. Upon receipt of the configuration information, the IAB node may measure the IAB node having the even-numbered hop order in one of the SMTCs, and measure the IAB node having the odd-numbered hop order in the other SMTC.

With reference to FIGS. 2, 3, and 4, multiplexing of a backhaul link between a gNB and an IAB node or between IAB nodes and an access link between a gNB and a UE or between an IAB node and a UE in radio resources according to the IAB technology provided by the present disclosure will be described below in detail.

Figure 2A:
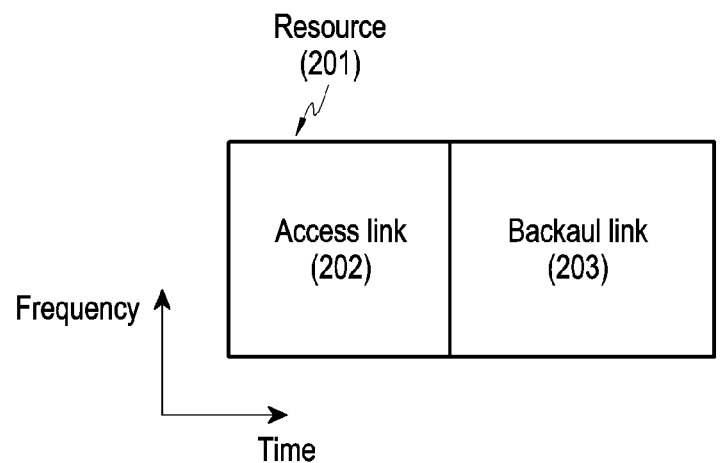
FIGS. 2A and 2B are diagrams illustrating exemplary time division multiplexing (TDM) and frequency division multiplexing (FDM) between an access link and a backhaul link of an IAB node, respectively.
Figure 2B:
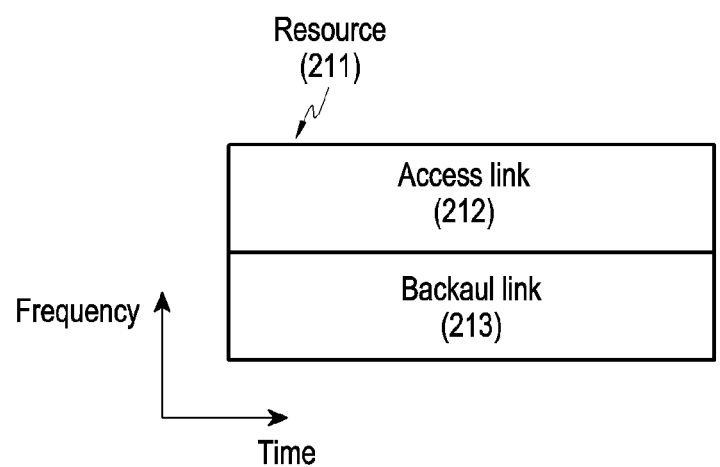

FIGS. 2A and 2B are diagrams illustrating examples of resource multiplexing between an access link and a backhaul link in an IAB node.

FIG. 2A is a diagram illustrating an example of time division multiplexing (TDM) of resources between an access link and a backhaul link in an IAB node. FIG. 2B is a diagram illustrating an example of frequency division multiplexing (FDM) of resources between an access link and a backhaul link in an IAB node.

In FIG. 2A, a backhaul link 203 between a gNB and an IAB node or between IAB nodes and an access link 202 between the gNB and a UE or between an IAB node and the UE are multiplexed in TDM in radio resources 201. Therefore, when resources are multiplexed between the access link and the backhaul link in TDM in an IAB node as illustrated in FIG. 2A, data is not transmitted and received between the gNB and the IAB nodes in a time area in which the gNB or the IAB nodes transmit and receive data to and from the UE, and the gNB or the IAB nodes do not transmit and receive data to and from the UE in a time area in which data is transmitted and received between the gNB and the IAB nodes.

In FIG. 2B, a backhaul link 213 between a gNB and an IAB node or between IAB nodes and an access link 212 between the gNB and a UE or between an IAB node and the UE are multiplexed in FDM in radio resources 211. Therefore, although data may be transmitted and received between the gNB and the IABs in a time area in which the gNB or the IAB nodes transmit and receive data to and from the UE, only data transmissions in the same direction are possible due to the unidirectional transmission/reception property of the IAB nodes. For example, a first IAB node may only receive backhaul data from another IAB node or a gNB in a time area in which the first IAB node receives data from a UE. In addition, the first IAB node may only transmit backhaul data to the other IAB node or the gNB in a time area in which the first IAB node transmits data to the UE.

While only TDM and FDM have been described as multiplexing schemes in the examples of FIGS. 2A and 2B, spatial division multiplexing (SDM) is also available between an access link and a backhaul link. Therefore, although transmissions/receptions may be performed in SDM on the access link and the backhaul link, only data transmissions in the same direction are possible in SDM in view of the unidirectional transmission/reception property of IAB nodes as in FDM illustrated in FIG. 2B. For example, the first IAB node may only receive backhaul data from the other IAB node or the gNB in a time area in which the first IAB node receives data from the UE. In addition, the first IAB node may only transmit backhaul data to the other IAB node or the gNB in a time area in which the first IAB node transmits data to the UE.

The IAB node may transmit information indicating which one of TDM, FDM, and SDM is used in capability information about the multiplexing scheme to the gNB or a higher IAB node (e.g., parent IAB node), when the IAB node initially accesses the gNB or the higher IAB node. Alternatively, the IAB node may later receive the information indicating which one of TDM, FDM, and SDM is used from the gNB or the higher IAB node by higher-layer signaling (higher-layer signal) such as system information or radio resource control (RRC) information. Alternatively, after the initial access, the IAB node may receive the information indicating which one of TDM, FDM, and SDM is used from the gNB or the higher-layer IAB node on a backhaul link. Alternatively, after transmitting the capability information to the gNB or the higher IAB node, a determination as to which multiplexing scheme is to be used may depend on implementation of the IAB, and the IAB node may report a multiplexing scheme to be used in a specific slot or radio frame for a specific time period or continuously to the gNB or the higher IAB node by backhaul or higher-layer signaling.

While the multiplexing schemes between an access link and a backhaul link have been mainly described in the examples of FIGS. 2A and 2B, the same multiplexing schemes may be applied between backhaul links. For example, the MT (backhaul link) and DU (backhaul link or access link) of one IAB node may be multiplexed in the methods described in the examples of FIGS. 2A and 2B, as described below.

Figure 3A:
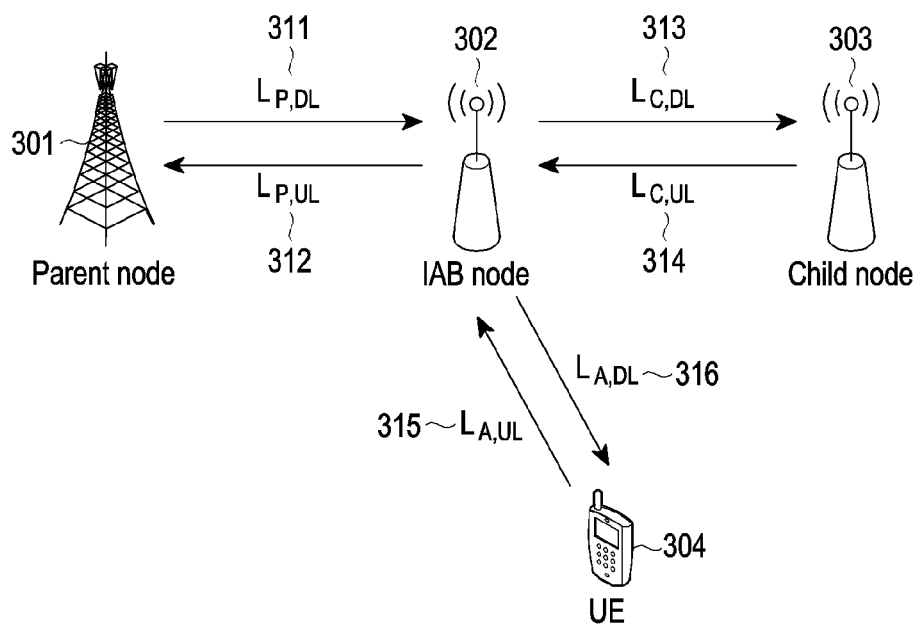
FIGS. 3A and 3B are diagrams illustrating exemplary TDM between an access link and a backhaul link of an IAB node.
Figure 3B:
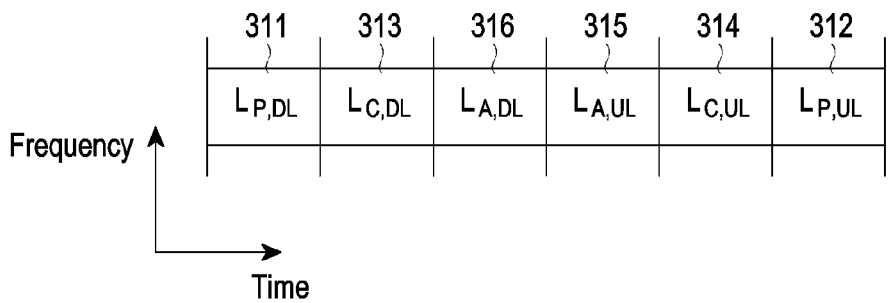

FIGS. 3A and 3B are diagram illustrating an example of TDM between an access link and a backhaul link in resources in an IAB node.

FIG. 3A illustrates a process of communicating with a parent node 301, a child IAB node 303, and a UE 304 by an IAB node 302. Links among the nodes will be described in more detail. The parent node 301 transmits a backhaul DL signal to the IAB node 302 on a backhaul downlink LP,DL 311, and the IAB node 302 transmits a backhaul UL signal to the parent node 301 on a backhaul UL LP,UL 312. The IAB node 302 transmits an access DL signal to the UE 304 on an access DL LA,DL 316, and the UE 304 transmits an access UL signal to the IAB node 302 on an access UL LA,UL 315. The IAB node 302 transmits a backhaul DL signal to the child IAB node 303 on a backhaul DL LC,DL 313, and the IAB child node 303 transmits a backhaul UL signal to the IAB node 302 on a backhaul UL LC,UL 314. In the example of FIGS. 3A and 3B, the subscript P means a backhaul link with a parent, the subscript A means an access link with a UE, and the subscript C means a backhaul link with a child.

The link relationship of FIG. 3A has been described from the perspective of the IAB node 302. From the perspective of the child IAB node 303, the parent node is the IAB node 302, and another lower IAB child node may exist for the child IAB node 303. From the perspective of the parent node 301, the child node is the IAB node 302, and another IAB parent node may exist above the parent node 301.

Each of the backhaul UL/DL signal and the access UL/DL signal may include at least one of data and control information, a channel carrying the data and the control information, a reference signal (RS) required to decode the data and the control information, or an RS required to obtain channel information.

FIG. 3B illustrates an example of multiplexing all of the above links in TDM. In the example of 3B, the backhaul DL LP,DL 311, the backhaul DL LC,DL 313, the access DL LA,DL 316, the access UL LA,UL 315, the backhaul UL LC,UL 314, and the backhaul UL LP,UL 312 are multiplexed in time order. The precedence relation of the links in the example of FIGS. 3A and 3B is an example, and any other precedence relation may also be applied.

Since the links are multiplexed in TDM in time order, this is the most time-consuming multiplexing scheme to transmit a signal from the parent node 301 through the IAB node 302 to the child IAB node 303 and to the UE 304. Therefore, to reduce latency in transmitting a signal from the parent node 301 finally to the UE 304, a method of multiplexing between the backhaul links or between the backhaul links and the access links in FDM or SDM, for transmissions at the same time may be considered.

Figure 4A:
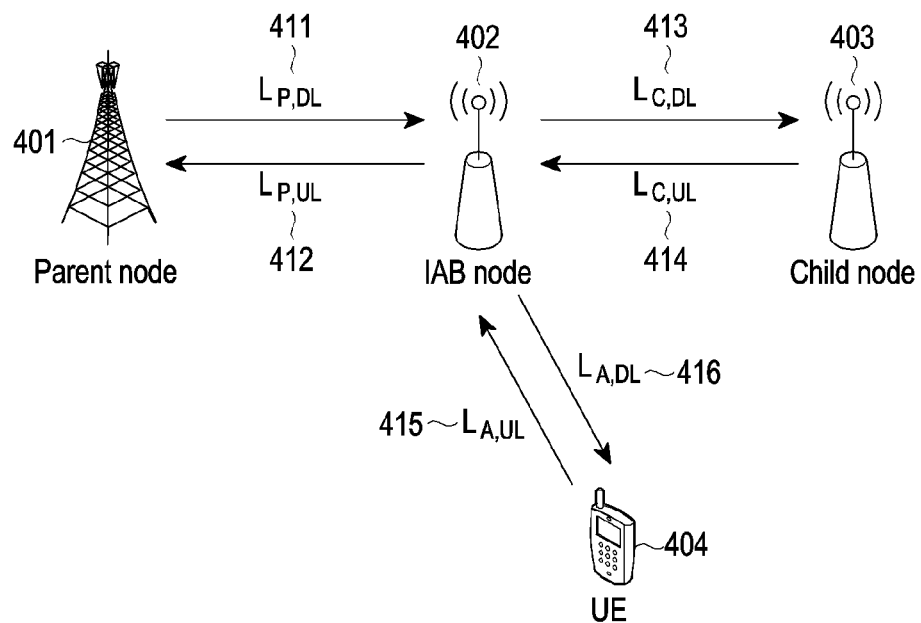
FIGS. 4A and 4B are diagrams illustrating exemplary FDM and spatial division multiplexing (SDM) between an access link and a backhaul link of an IAB node.
Figure 4B:
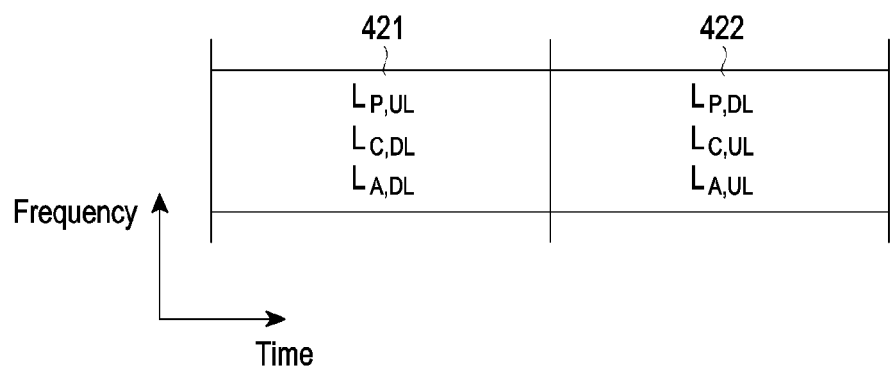

FIGS. 4A and 4B are diagrams illustrating an example of FDM and SDM between access links and backhaul links in an IAB node.

With reference to FIGS. 4A and 4B, a method of reducing latency by multiplexing between backhaul links or between a backhaul link and an access link in FDM or SDM will be described.

Similar FIG. 3A, FIG. 4A illustrates a process of communicating with a parent node 401, a child IAB node 403, and a UE 404 by an IAB node 402. Links among the nodes will be described in more detail. The parent node 401 transmits a backhaul DL signal to the IAB node 402 on a backhaul DL LP,DL 411, and the IAB node 402 transmits a backhaul UL signal to the parent node 401 on a backhaul UL LP,UL 412. The IAB node 402 transmits an access DL signal to the UE 404 on an access DL LA,DL 416, and the UE 404 transmits an access UL signal to the IAB node 402 on an access UL LA,UL 415. The IAB node 402 transmits a backhaul DL signal to the child IAB node 403 on a backhaul DL LC,DL 413, and the IAB child node 403 transmits a backhaul UL signal to the IAB node 402 on a backhaul UL LC,UL 414. In the example of FIGS. 4A and 4B, the subscript P means a backhaul link with a parent, the subscript A means an access link with a UE, and the subscript C means a backhaul link with a child.

The link relationship of FIG. 4A is described from the perspective of the IAB node 402. From the perspective of the IAB child node 403, the parent node is the IAB node 402, and another IAB child node may exist below the IAB child node 403. From the perspective of the parent node 401, the child node is the IAB node 402, and another IAB parent node may exist above the parent node 401.

Each of the backhaul UL/DL signal and the access UL/DL signal may include at least one of data and control information, a channel carrying the data and the control information, an RS required to decode the data and the control information, or an RS required for obtaining channel information.

FIG. 4B illustrates an exemplary FDM or SDM.

As described above, since the IAB node has a unidirectional transmission/reception property at one instant, signals that may be multiplexed in FDM or SDM are limited. For example, in consideration of the unidirectional transmission/reception property of the IAB node 402, the backhaul UL LP,UL 412, the backhaul DL LC,DL 413, and the access DL LA,DL 416 may be multiplexed in a time area available for transmission from the IAB node 402. Accordingly, when the links are multiplexed in FDM or SDM, the IAB node 402 may transmit signals on all of the links in the same time area, as indicated by reference numeral 421. Further, the backhaul DL LP,DL 411, the backhaul UL LC,UL 414, and the access UL LA,UL 415 may be multiplexed in a time area available for reception at the IAB node 402. Accordingly, when the links are multiplexed in FDM or SDM, the IAB node 402 may receive signals on all of the links in the same time area, as indicated by reference numeral 422.

The multiplexing of links in the embodiment of FIGS. 4A and 4B is an example, and it is obvious that only two of the three links may be multiplexed in FDM or SDM. That is, the IAB node may transmit/receive a signal by multiplexing some of the links available for multiplexing.

Now, a description will be given of the structure of an IAB node.

Various types of gNB structures optimized for service requirements have been studied to support various services such as large-capacity transmission, low-latency and high-reliability transmission, or massive MTC and reduce capital expenditures (CAPEX) in the 5G system. In the 4G LTE system, a cloud RAN (C-RAN) structure has been commercialized, in which a radio processor and a radio transceiver (or remote radio head (RRH)) of a BS are separated and the radio processor is centralized, while only the radio transceiver resides at a cell site, in order to reduce CAPEX and efficiently control interference.

In the C-RAN structure, when the radio processor of the BS transmits baseband digital in-phase and quadrature-phase (IQ) data to the radio transceiver, a common public radio interface (CPRI) optical link is generally used. When data is transmitted to the radio transceiver, a large data capacity is required. For example, 614.4 Mbps is required for 10-MHz Internet protocol (IP) data, and 1.2 Gbps is required for 20-MHz IP data. Therefore, a 5G RAN structure is designed such that a gNB is divided into a CU and a DU to reduce the enormous load of an optical link, and functional split is applied to the CU and the DU to have various structures.

The 3GPP is working on standardization of various functional split options between the CU and the DU, and the functional split options split functions between protocol layers or within a protocol layer. There are a total of 8 options, Option 1 to Option 8. Among them, Option 2 and Option 7 are considered with priority in the current 5G gNB structure. In Option 2, the RRC layer and the packet data convergence protocol (PDCP) layer are located in the CU, and the radio link control (RLC) layer, the medium access control (MAC) layer, the physical (PHY) layer, and the radio frequency (RF) are located in the DU. In Option 7, the RRC, PDCP, RLC, MAC, and higher PHY layers are located in the CU, and the lower PHY layer is located in the DU.

A structure with deployment flexibility for splitting and moving NR network protocols may be implemented between the CU and the DU through the above functional split. Flexible hardware implementation based on this structure provides a cost-effective solution, the CU-DU split structure enables load management, adjustment of real-time performance optimizations, and network functions virtualization (NFV)/software defined network (SDN), and the configurable functional split is applicable to various application examples (variable latency in transmission).

Figure 5:
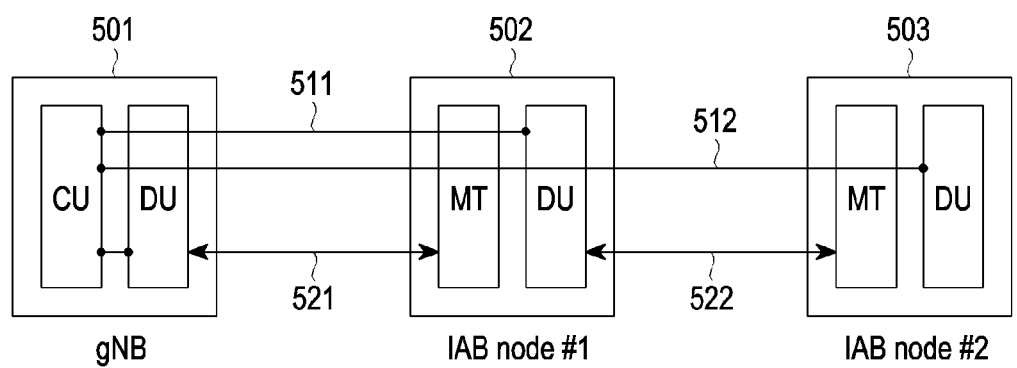
FIG. 5 is a diagram illustrating the structure of an IAB node.

Accordingly, the structure of an IAB node in consideration of the above-described function split will be described with reference to FIG. 5. FIG. 5 is a diagram schematically illustrating the structure of an IAB node.

Referring to FIG. 5, a gNB 501 includes a CU and a DU, and each of IAB nodes has a UE function (MT) for transmitting and receiving data to and from a parent node on a backhaul link and a gNB function (DU) for transmitting and receiving data to and from a child node on a backhaul link. In FIG. 5, IAB node #1 502 is wirelessly connected to the gNB 501 by one hop, and IAB node #2 503 is wirelessly connected to the gNB 501 via IAB node #1 502 by two hops.

As illustrated in FIG. 5, the CU of the gNB 501 may control the DUs of all IAB nodes wirelessly connected to the gNB 501, that is, IAB node #1 502 and IAB node #2 as well as the DU of the gNB 501, as indicated by reference numerals 511 and 512. The CU of the gNB 501 may allocate radio resources to the DUs so that the DUs transmit/receive data to/from the MTs of IAB nodes below the DUs. The radio resource allocations may be transmitted to the DUs via F1 application protocol (F1AP) interfaces by a higher-layer signal such as system information or RRC information or a physical-layer signal. For F1AP, 3GPP TS 38.473 may be referred to. The radio resources may include DL time resource, UL time resources, flexible time resources, and so on.

A radio resource configuration will be described in detail in the context of IAB node #2 503. The DL time resources are resources in which the DU of IAB node #2 503 transmits a DL control/data signal to the MT of a lower IAB node. The UL time resources are resources in which the DU of IAB node #2 503 receives a UL control/data signal from the MT of the lower IAB node. The flexible time resources are resources that may be utilized as DL time resources or UL time resources by the DU, and how the flexible time resources are used may be indicated to the MT of the lower IAB node by a DL control signal from the DU. Upon receipt of the DL control signal, the MT of the lower IAB node determines whether to use the flexible time resources as DL time resources or UL time resources.

When the MT of the lower IAB node fails to receive the DL control signal, the MT of the lower IAB does not perform a transmission/reception operation. That is, the MT does not monitor or decode a DL control channel in the resources or does not measure a signal in the resources. The MT of the lower IAB node does not perform a transmission/reception operation in the resources. For the DL time resources, UL time resources, and flexible time resources, the CU may indicate two different types (or three different types including the time resources which are always unavailable) to the DU.

The first type is a soft type. The CU of the gNB 501 may configure soft-type DL time resources, UL time resources, and flexible time resources to the DU of IAB node #2 503 by F1AP (an interface between the CU and the DU). An IAB node #1 502, which is a parent IAB (or the DU of the parent IAB) of IAB node #2 503 may explicitly (e.g., by a DCI format) or implicitly indicate whether the configured soft-type resources are available or unavailable to the IAB node #2 503 being a child IAB node (or the DU of the child IAB node). That is, when specific resources are indicated as available, the DU of IAB node #2 503 may use the resources for data transmission/reception to/from the MT of the lower IAB node. That is, the DU of IAB node #2 503 may perform a transmission when the resources are DL resources, and a reception when the resources are UL resources. When the resources are indicated as unavailable, IAB node #2 503 may not use the resources for data transmission/reception to/from the MT of the lower IAB node. That is, the DU of IAB node #2 503 may not transmit or receive a signal in the resources.

A method of indicating the availability of soft-type resources by a DCI format will be described in more detail. The DCI format in this embodiment may include an availability indicator for indicating the availability of one or more consecutive UL, DL, or flexible symbols.

To receive the DCI format, IAB node #2 503 may preliminarily receive information about the position of the availability indicator indicating availability for the IAB node #2 in the DCI format, a table indicating the availability of time resources corresponding to a plurality of slots, or a mapping relationship of the availability indicator, together with the cell ID of the DU of IAB node #2 503 from the CU or the parent IAB node by a higher-layer signal. Values (or indications) indicating the availability of consecutive UL symbols, DL symbols, or flexible symbols in one slot and the meanings of the values (or indications) may be configured as illustrated in Table 1 below.

TABLE 1

| Value | Indication |
|---|---|
| 0 | No indication of availability for soft symbols |
| 1 | DL soft symbols are indicated available |
| | No indication of availability for UL and Flexible soft symbols |
| 2 | UL soft symbols are indicated available |
| | No indication of availability for DL and Flexible soft symbols |
| 3 | DL and UL soft symbols are indicated available |
| | No indication of availability for Flexible soft symbols |
| 4 | Flexible soft symbols are indicated available |
| | No indication of availability for DL and UL soft symbols |
| 5 | DL and Flexible soft symbols are indicated available |
| | No indication of availability for UL soft symbols |
| 6 | UL and Flexible soft symbols are indicated available |
| | No indication of availability for DL soft symbols |
| 7 | DL, UL, and Flexible soft symbols are indicated available |

When the IAB node #2 503 receives an indication of the above availability indicator in the DCI format from the parent IAB node, the DU of IAB node #2 503 may interpret the relationship between DL, UL, or flexible time resources configured for the IAB DU by the CU and the above-described availability in the following methods.

A first method is that the IAB DU expects that the number of values indicating availability included in the availability indicator of the DCI format is equal to the number of slots including a soft type configured with consecutive symbols configured by the CU. According to this method, the IAB DU may determine that the availability is applied only to the slots including the soft type.

A second method is that the IAB DU expects that the number of values indicating availability included in the availability indicator of the DCI format is equal to the number of all slots configured by the CU, that is, all slots including a hard/soft/non-available (NA) type. In this embodiment, the IAB DU may determine that the availability is applied only to slots including the soft type, and that the indicated availability is not applied to a slot including only the hard or NA type without the soft type.

In the first and second methods, the IAB DU may expect that the meaning of a value indicating the availability matches the DL resources, UL resources, or flexible resources configured by the CU. For example, when only DL soft resources or DL hard resources exist in a slot, the IAB DU may expect that only a value of 1 in Table 1 may be indicated. Therefore, the IAB node may expect that among the values in Table 1, values including the availability of UL soft resources are not indicated.

Further, the IAB DU may determine that at least for the flexible resources configured by the CU, it may also be indicated whether the flexible resources are used as DL resources or UL resources, in addition to a value indicating that the flexible resources are available. For example, in the case of flexible soft resources or flexible hard resources, the IAB node may expect that a value of 1 or 2 may be indicated, instead of a value of 4 in Table 1. In this case, the DU of IAB node #2 may determine that the flexible resources may be used only for UL or DL by an indication from the parent IAB node, rather than according to a determination of IAB node #2.

In addition, the IAB DU expects that the value of 0 in Table 1 may be indicated for any hard/soft or NA resources configured by the CU. In this case, the IAB DU determines that the hard/soft resources configured by the CU are not available, and until the DCI format indicates later that the resources are available, the resources are not available for data transmission and reception of the DU of IAB node #2 to and from the MT of the lower IAB node, like the resource type which is always unavailable, configured by the CU. Then, when the DCI format indicates that the resources are available again, the DU of IAB node #2 may use the resources as configured by the CU and indicated by the DCI format.

A second type is a hard type in which the above resources are always used between the DU and the MT. That is, when the resources are DL time resources, the DU of IAB node #2 may perform a transmission, and when the resources are UL resources, the DU of IAB node #2 may perform a reception, regardless of transmission and reception of the MT of IAB node #2. When the resources are flexible resources, the IAB DU may perform a transmission or reception according to a determination of the IAB DU (that is, according to the DCI format indicating to the MT of the lower IAB node whether the flexible resources are DL or UL resources).

A third type is a type that is not available at any time (not used at all or always unavailable), and the DU of IAB node #2 may not use these resources for data transmission/reception to/from the MT.

In the above types, the DU may also receive information about the above types, when DL time resources, UL time resources, flexible time resources, and reserved time resource are signaled by a higher-layer signal from the CU.

Referring to FIG. 5, the DU of the gNB 501 performs a normal gNB operation and performs scheduling to control the MT of IAB node #1 502 to transmit and receive data (521). The DU of IAB node #1 502 performs a normal gNB operation and performs scheduling to control the MT of IAB node #2 503 to transmit/receive data (522).

The DU may indicate radio resources to the MT of a lower IAB node to transmit/receive data to/from the MT of the IAB node based on radio resources allocated by the CU. A configuration for the radio resources may be transmitted to the MT by system information, a higher-layer signal, or a physical-layer signal. The radio resources may include DL time resources, UL time resources, flexible time resources, and reserved time resources. The DL time resources are resources in which the DU transmits a DL control/data signal to the MT of the lower IAB node. The UL time resources are resources in which the DU receives a UL control/data signal from the MT of the lower IAB node.

The flexible time resources are resources available as DL time resources or UL time resources for the DU, and how the flexible time resources are used for the MT of the lower IAB node may be indicated by a DL control signal from the DU. Upon receipt of the DL control signal, the MT determines whether the flexible time resources are used as DL or UL time resources. When failing to receive the DL control signal, the MT does not perform a transmission/reception operation. That is, the MT does not monitor or decode a DL control channel in the resources or does not measure a signal in the resources.

The DL control signal may be signaled to the MT in the form of a combination of a higher-layer signal and a physical-layer signal, and the MT may receive the signaling to determine a slot format in a specific slot. The slot format may be configured to basically start with a DL symbol, include a flexible symbol in the middle, and end with a UL symbol (e.g., in a D-F-U structure). When only the above slot format is used, the DU of the IAB node may perform a DL transmission at the beginning of the slot. However, since the MT of the IAB node is configured with the same slot format (i.e., D-F-U structure) by the parent IAB node, the MT of the IAB node may not perform a UL transmission at the same time (corresponding to slot format indexes 0 to 55 in Table 2 below). The slot format configured to start with a UL symbol, include a flexible symbol in the middle, and end with a DL symbol may be illustrated in Table 2 below (corresponding to slot format indexes 56 to 96 in Table 2 below), by way of example. The slot format illustrated in Table 2 below may be transmitted to the MT by a DL control signal, and may be configured for the DU by the CU using F1AP.

TABLE 2

| 31 | D | D | D | D | D | D | D | D | D | D | D | F | U | U |
|---|---|---|---|---|---|---|---|---|---|---|---|---|---|---|
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | D | F | U | D | D | D | D | D | F | U |
| 47 | D | D | F | U | U | U | D | D | F | U | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | D | D | D | D | D | D | D |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | F | F | D |
| 79 | U | U | U | U | U | U | U | U | U | U | F | F | F | D |
| 80 | U | U | U | U | U | U | U | U | U | F | F | F | F | D |
| 81 | U | U | U | U | U | U | U | U | U | U | F | F | D | D |
| 82 | U | U | U | U | U | U | U | U | U | F | F | F | D | D |
| 83 | U | U | U | U | U | U | U | U | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | F | F | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | D | D | D | D | D | D | D | D |

The reserved time resources are resources in which data may not be transmitted/received to/from the lower MT of the DU, and the MT does not perform a transmission/reception operation in the resources. That is, the MT does not monitor or decode a DL control channel in the resources or does not measure a signal in the resources.

Accordingly, the MT of one IAB node receives scheduling and transmit/receive data under the control of the DU of a higher IAB node, and the DU of the IAB node is controlled by the CU of the gNB 501. As the MT and DU of one IAB are controlled by different entities, it is difficult to coordinate the MT and the DU in real time.

Figure 6:
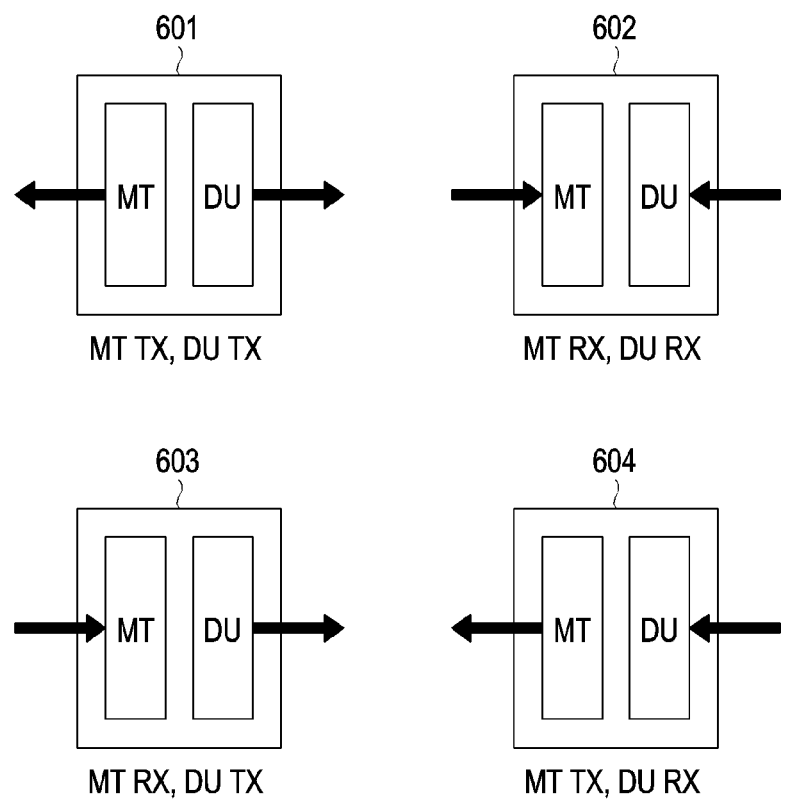
FIG. 6 is a diagram illustrating a communication method for simultaneous transmission and reception of an MT and a DU included in an IAB node in a wireless communication system according to an embodiment of the present disclosure.

FIG. 6 is a diagram illustrating a communication method for simultaneous transmission and reception between the MT and the DU of an IAB node in a wireless communication system according to an embodiment of the present disclosure. In FIG. 6, simultaneous transmission and reception between the MT and the DU of an IAB node means that the MT transmits or receives a signal and the DU transmits or receives a signal at the same time according to the multiplexing schemes described in FIGS. 2A and 2B.

Referring to FIG. 6, reference number 601 denotes that both of the MT and the DU of one IAB node transmit signals, respectively. In the case 601, the signal transmitted by the MT of the IAB node may be received by the DU of a parent IAB node or a gNB through a backhaul UL, as described with reference to FIGS. 3, 4, and 5. In the case 601, the signal transmitted by the DU of the IAB node may be received by the MT of a child IAB node through a backhaul DL or by an access UE through an access DL, as described with reference to FIGS. 3, 4, and 5.

Reference numeral 602 denotes that both of the MT and the DU of one IAB node receive signals, respectively. In the case 602, the signal received by the MT of the IAB node may be a signal transmitted from the DU of a parent IAB node or a gNB through a backhaul DL, as described with reference to FIGS. 3, 4, and 5. In the case 602, the signal received by the DU of the IAB node at the same time may be a signal transmitted by the MT of a child IAB node through a backhaul UL or by an access UE through an access UL, as described with reference to FIGS. 3, 4, and 5.

Reference number 603 denotes that the MT and the DU of the IAB node receive and transmit signals, respectively. That is, in the case 603, the MT of the IAB node may receive a signal, and the DU of the IAB node may transmit a signal at the same time. In the case 603, the signal received by the MT of the IAB node may be a signal transmitted from the DU of a parent IAB node or a gNB through a backhaul DL, as described with reference to FIGS. 3, 4, and 5. In addition, in the case 603, the signal transmitted by the DU of the IAB node at the same time may be a signal received by the MT of a child IAB node through a backhaul DL or by an access UE through an access DL, as described with reference to FIGS. 3, 4, and 5.

Reference number 604 denotes that the MT and the DU of the IAB node transmit and receive signals, respectively. That is, in the case 603, the MT of the IAB node may transmit a signal, and the DU of the IAB node may receive a signal at the same time. In the case 604, the signal transmitted by the MT of the IAB node may be received by the DU of a parent IAB node or a gNB through a backhaul UL, as described with reference to FIGS. 3, 4, and 5. In addition, in the case 604, the signal received by the DU of the IAB node at the same time may be a signal transmitted by the MT of a child IAB node through a backhaul UL or by an access UE through an access UL, as described with reference to FIGS. 3, 4, and 5.

In the present disclosure, embodiments will be provided for a method of aligning slot timings in a situation in which both the MT and the DU of one IAB node transmit signals in the case 602 and related procedures of a parent IAB node and the IAB node. The following embodiments are also applicable to the cases 601, 603 and 604 as well as the case 602.

Figure 7:
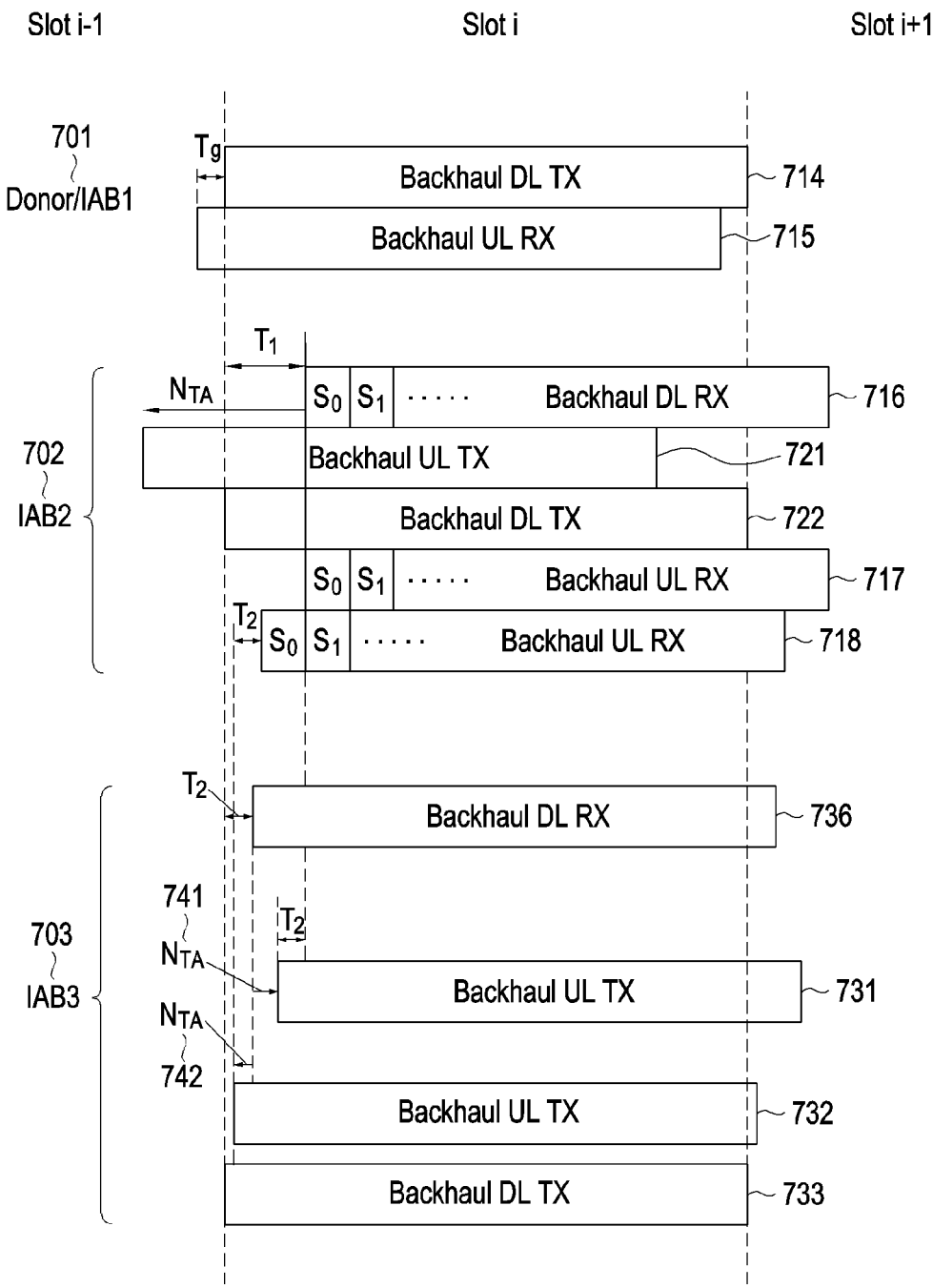
FIG. 7 is a diagram illustrating a communication method for aligning backhaul link reception timings in an IAB node in a wireless communication system according to an embodiment of the present disclosure.

FIG. 7 is a diagram illustrating an embodiment of aligning backhaul transmission/reception timings in an IAB node in a wireless communication system according to an embodiment of the present disclosure.

With reference to FIG. 7, a method of aligning DL transmission timings between IAB nodes and a method of aligning the DL reception timing of the MT of an IAB node with the UL reception timing of the DU of the IAB node will be described. For convenience in the present disclosure, aligning DL transmission timings between the DUs of IAB nodes in slot i is referred to as a Case #1 timing, and aligning the DL reception timing of the MT of an IAB node with the UL reception timing of the DU of the IAB node in slot i will be referred to as a Case #7 timing.

In the present disclosure, alignment of timings between A and B may refer to placing the time difference between the first symbols of A and B within a cyclic prefix (CP) duration value corresponding to a subcarrier spacing, when A and B have the same subcarrier spacing, and placing the time difference between the first symbols of A and B within a CP duration value corresponding to a larger subcarrier spacing, when A and B have different subcarrier spacings. The above description is about slot-level timing alignment, and symbol-level timing alignment may be applied to symbols having different indexes in A and B (e.g., the first symbol of a slot of A and the second symbol of a slot of B).

In FIG. 7, Tg denotes a switching time between a DU DL transmission 714 and a DU UL reception 715 in IAB1 701 being a gNB/parent IAB node. Alignment between the timing of a DL transmission 722 of IAB2 702 and the timing of a DU DL transmission 714 of the gNB/parent IAB node, IAB1 701, that is, the Case #1 timing will be described. The MT of IAB2 702 receives the DU DL signal 714 from IAB1 701 after a propagation delay of T1 (716). IAB2 702 may assume that the timing difference between the DU DL signal 714 and the DL signal 716 received by the MT of IAB2 702 is, for example, $(N_{TA}/2+N_{delta}+T_{delta} \cdot G_{step}) \cdot T_c$ to estimate the propagation delay time of T1. NTA is a UL timing advance (TA) provided by IAB1 701. Tdelta is provided by IAB1 701. IAB2 702 may receive NTA and Tdelta in a MAC signal from IAB1 701. Ndelta and Gstep are constants for frequency range 1 (FR1) and frequency range 2 (FR2), defined in the 5H system. For example, for FR1, Ndelta=−70528 and Gstep=64, and for FR2, Ndelta=−17644 and Gstep=32.

The Case #1 timing of IAB2 702 may be applied by applying the above timing difference based on the DL signal 716 received by the MT of IAB2 702. For the timing of the UL transmission 721 of IAB2 702, IAB2 702 starts the UL transmission 721 at a time earlier by the UL TA NTA from the DL signal 716 received by the MT of IAB2 702. That is, the timing of the UL transmission 721 applied in the Case #1 timing is adjusted in the same manner as a UL transmission timing adjustment procedure applied by a UE. The above-described Case #1 timing procedure may be applied in the same manner for IAB3 703 to align the timing of the UE's DU DL transmission 733 with the timing of a DL transmission 722 of IAB2 702 being a parent IAB node of IAB3 703. That is, as IAB2 702 performs the procedure of the gNB/parent IAB node and IAB3 703 performs the procedure of IAB2 702, the above-described Case #1 timing applying procedure may be applied in the same manner to IAB2 702 being the parent IAB node and IAB3 703 being the child IAB node. The above embodiment is an example, and the communication method of an IAB node according to the present disclosure may be applied in the same manner even when three or more IAB nodes exist.

The Case #7 timing scheme for aligning the timing of the DL reception 716 of the MT of IAB2 702 with the timing of a UL reception 717 or 718 of the DU of IAB2 702 will be described. In the present disclosure, three methods are provided.

[First Method]

In the first method, a UL TA, NTA may be extended to have a negative value as well as a positive value and supported for the UL transmission timing of the MT of IAB3 703, so that timings may be aligned at the slot level. When the IAB1 701 instructs IAB2 702 to apply the Case #7 timing to a specific slot or IAB2 702 reports that the IAB1 702 will apply the Case #7 timing to the specific slot, IAB2 702 may transmit an extended UL TA 741 (e.g., a TA, NTA having a negative value as well as a positive value to IAB3 703 by a higher-layer signal. IAB3 703 may receive the extended UL TA 741, and the MT of IAB3 703 may perform a UL transmission 731 by applying the extended UL TA 741 to the timing of the UL transmission 731. The value of the UL TA 741 may be understood as an offset value of uplink transmission timing in the MT of the IAB3 703.

In this case, IAB2 702 may align the timing of the DL reception 716 of the MT of IAB2 702 with the timing of the UL reception of the DU of IAB2 702, starting from the first symbol of each slot. That is, timings are aligned between the first symbol S0 of a slot in which the MT of IAB2 702 performs the DL reception 716 and the first symbol S0 of a slot in which the DU of IAB2 702 performs the UL reception 717, for the slot-level timing alignment. In FIG. 7, the UL transmission 731 of the MT of IAB3 703 is received at the timing of the UL reception 717 of the DU of IAB2 702 after a time delay of the extended UL TA 741 (e.g., a negative TA, NTA) and T2. A propagation delay time T2 may be estimated in the same manner as for the propagation delay time T1.

[Second Method]

In the second method, although a UL TA 742, NTA having a value of 0 or a positive value is supported for the UL transmission timing of the MT of IAB3 703 as is conventionally done, timings are aligned at the symbol level. When IAB1 701 instructs IAB2 702 to apply the Case #7 timing to a specific slot or IAB2 702 reports to the IAB1 701 that the IAB2 702 will apply the Case #7 timing to the specific slot, IAB2 702 may transmit the UL TA 742 to IAB3 703 by a higher-layer signal. IAB3 703 may receive the UL TA 742, and the MT of IAB3 703 may perform a UL transmission 732 by applying the UL TA 742 to the timing of the UL transmission 731.

In this case, IAB2 703 may align the timing of the DL reception 715 of the MT of IAB 702 with the timing of the UL reception 718 of the DU of IAB2 702 at the symbol level. That is, timings are aligned between the first symbol S0 of a slot in which the MT of IAB2 702 performs the DL reception 716 and the first symbol S0 of a slot in which the DU of IAB2 702 performs the UL reception 718, for the symbol-level timing alignment, not the slot-level timing alignment. Although this method obviates the need for the extended UL TA, NTA, a procedure for the first symbol S0 is required because the first symbol S0 with the UL reception 718 does not overlap with the symbols of the slot with the DL reception 716.

One approach may be to leave the first symbol S0 empty and map data or information to resource elements, starting from the second symbol Si. That is, data may be mapped by rate-matching symbols, starting from the second symbol Si. Another approach may be that the MT of IAB3 703 maps data or information to resource elements for the UL transmission 732, starting from the first symbol S0. Herein, the DU of IAB2 702 may perform decoding by puncturing the first symbol S0 or mapping a zero value to the first symbol S0 during the UL reception 718. In both of the two approaches, IAB2 702 and IAB3 703 may have the prior knowledge that the Case #7 timing with the second method applied thereto is applied to the UL transmission 732 of the MT of IAB3 703.

[Third Method]

In the third method, IAB1 701 configures whether IAB2 702 is to apply the first method or the second method by a higher-layer signal. IAB2 702 may receive the higher-layer signal and apply the Case #7 timing by applying the first method or the second method as configured by the higher-layer signal.

Now, a description will be given of an embodiment of signaling instructing IAB2 702 to apply the Case #7 timing by IAB1 701 or signaling indicating application of the Case #7 timing to IAB1 701 and IAB3 703 by IAB2 702. Before the signaling, traffic conditions of IAB1 701 and IAB3 703 which require simultaneous receptions at the DU and the MT may be reported to the gNB 701 or shared among IAB1 701, IAB2 702, and IAB3 703 through backhaul signaling. For example, the traffic conditions may be information about a buffer status for UL/DL traffic or information about a buffer status for UL/DL traffic during a specific time period (or specific slots).

In one example of Signaling 1, bitmap information indicating whether the Case #7 timing is applied to each slot, periodicity information, time duration information, information about slots in which the Case #7 timing is not applied, and so on by a higher-layer signal.

In one example of Signaling 2, a higher-layer signal including signaling 1 and a DL control signal indicating whether the higher-layer signal is activated.

In one example of Signaling 3, a higher layer signal including a signaling 1 set and a DL control signal indicating one signaling 1 in the set.

In one example of Signaling 4, it is indicated whether the Case #7 timing is applied by a bit field of a DL control signal that schedules a UL data channel of the MT of IAB3 703, a bit field of a DL control signal that schedules a DL data channel of the MT of IAB2 702, or a bit field of a specific DL control signal.

IAB1 701, IAB2 702, and IAB3 703 may receive signaling by the signaling schemes alone or in combination and determine whether to apply the Case #7.

Now, a description will be given of information exchange between IAB2 702 and IAB1 701 or between IAB2 702 and IAB3 703, when IAB2 switches the Case #1 timing, a Case #6 timing, and the Case #7 timing to one another.

For convenience, alignment between the DL transmission timing of the DU of an IAB node and the UL transmission timing of the MT of the IAB node in slot i will be referred to as the Case #6 timing in the present disclosure.

For the Case #6 timing, a first method and a second method are available. In the first method, the UL transmission timing of the MT of IAB2 702 is aligned, referring to (based on) the DL transmission timing of the DU of IAB2 702, whereas in the second method, the DL transmission timing of the DU of IAB2 702 is aligned, referring to (based on) the UL transmission timing of the MT of IAB2 702. IAB1 701 may configure whether the first method or the second method is to be applied by a higher-layer signal.

The timing switching among the Case #1 timing, the Case #6 timing, and the Case #7 timing may include at least one or all of switching from the Case #1 timing to the Case #1 timing, switching from the Case #1 timing to the Case #6 timing, switching from the Case #1 timing to the Case #7 timing, switching from the Case #6 timing to the Case #1 timing, switching from the Case #6 timing to the Case #6 timing, switching from the Case #6 timing to the Case #7 timing, switching from the Case #7 timing to the Case #1 timing, switching from the Case #7 timing to the Case #6 timing, and switching from the Case #7 timing to the Case #7 timing.

IAB2 702 having the unidirectional transmission/reception property may report the number of guard symbols (or a time corresponding to a switching period) required for RF switching between DL and UL as well as RF switching the MT and the DU to IAB1 701 (or IAB3 703) by a higher-layer signal (RRC signaling or MAC control element (CE) signaling), and receive the number of available guard symbols (or the time corresponding to the switching period) from IAB1 701 (or IAB3 703) by a higher-layer signal (RRC signaling or MAC CE signaling). Information about the number of guard symbols (or the time corresponding to the switching period) may include information about a subcarrier spacing, and may be exchanged through corresponding information in Table 3 below.

TABLE 3

|  |  | Case #j | |
| --- | --- | --- | --- |
|  | MT to DU | DL TX | UL RX |
| Case #i | DL RX | a | b |
|  | UL TX | c | d |
|  | DU to MT | DL RX | UL TX |
|  | DL TX | e | f |
|  | UL RX | g | h |

In Table 3, i and j may be 1, 6, or 7. Information corresponding to Table 3 may be configured by setting the number of guard symbols for each of switching from the Case #1 timing to the Case #1 timing, switching from the Case #1 timing to the Case #6 timing, switching from the Case #1 timing to the Case #7 timing, switching from the Case #6 timing to the Case #1 timing, switching from the Case #6 timing to the Case #6 timing, switching from the Case #6 timing to the Case #7 timing, switching from the Case #7 timing to the Case #1 timing, switching from the Case #7 timing to the Case #6 timing, and switching from the Case #7 timing to the Case #7 timing, or by setting a maximum value of the number of guard symbols applicable to the switching. In Table 3, each of a to h represents the number of guard symbols. All of a to h may have different values or at least two of a to h may have the same value.

In Table 3, for the values of a specific switching, a timing applied by IAB3 703 as well as a timing switching at IAB2 702 may have to be considered. For example, when IAAB 2 702 switches from the Case #1 timing to the Case #6 timing and switches the RF from the DL reception (DL RX) of the MT to the UL reception (UL RX) of the DU, the timing of the DL reception of the DU may vary depending on whether IAB3 703 applies the Case #6 timing or the Case #7 timing. Accordingly, IAB3 703 may signal a used timing to IAB2 702, and IAB2 702 may report information of Table 3 including the guard symbol(s) (or switching period) to IAB1 701 by applying the signaling and receive scheduled information of Table 3 from IAB1 701. The information of Table 3 reported by IAB2 702 may be identical to or different from the information of Table 3 scheduled by IAB1 701. That is, IAB1 701 may schedule the number of guard symbols (or switching period) to be applied, based on the reported (requested) information from IAB2 702, and provide the scheduled number of guard symbols (or switching period) to IAB2 702.

In the case where IAB2 702 switches alternately between the Case #1 timing and the Case #6 timing according to an indication from IAB1 701 aside from Table 3, when the UL transmission timing of the MT of IAB2 702 advances by the Case #1 timing or recedes by the Case #6 timing, a UL transmission period based on the Case #1 timing may overlap with a UL transmission period based on the Case #6 timing. To solve the overlap problem, IAB1 701 may indicate a guard period between the UL transmission period based on the Case #1 timing and the UL transmission period based on the Case #6 timing to IAB2 702, and IAB2 702 may receive the indication. Alternatively, IAB2 702 may report a guard period required between the UL transmission period based on the Case #1 timing and the UL transmission period based on the Case #6 timing to IAB1 701, and receive information including the number of guard symbols (or switching period) scheduled by IAB1 701, as described above.

In another embodiment, IAB2 702 may report a maximum value of the number of guard symbols (or switching period) to IAB1 701, and IAB1 701 may provide the information including the number of guard symbols (or switching period) scheduled by IAB1 701, based on the maximum value.

Figure 8:
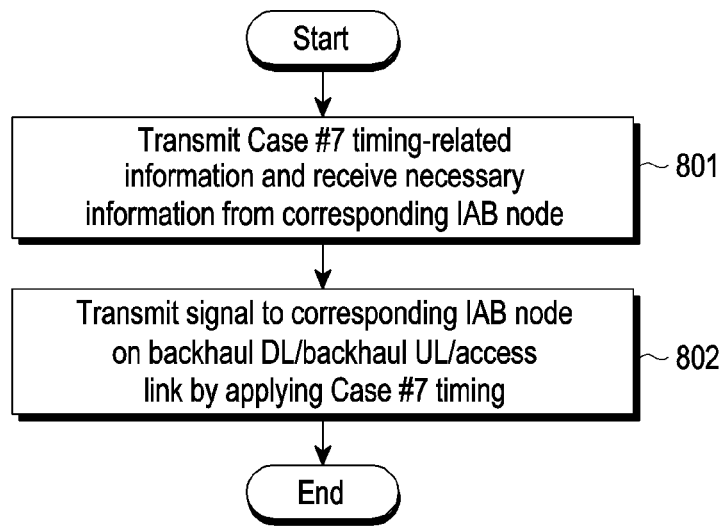
FIG. 8 is a flowchart illustrating an operation of a next generation Node B (gNB)/parent IAB node in a wireless communication system according to an embodiment of the present disclosure.

FIG. 8 is a flowchart illustrating an operation of a gNB/parent IAB node or a child IAB node in a wireless communication system according to an embodiment of the present disclosure.

Referring to FIG. 8, in operation 801, IAB1 701 or IAB3 703 of FIG. 7 transmits Case #1 timing-related information according to the embodiment of the present disclosure described in FIG. 7 to IAB2 702 of FIG. 7, and receives necessary information from IAB2 702. In operation 802, IAB1 701 or IAB3 703 transmits a signal to IAB2 702 on a backhaul DL or backhaul UL by applying the Case #7 timing according to the embodiment of the present disclosure described with reference to FIG. 7.

Figure 9:
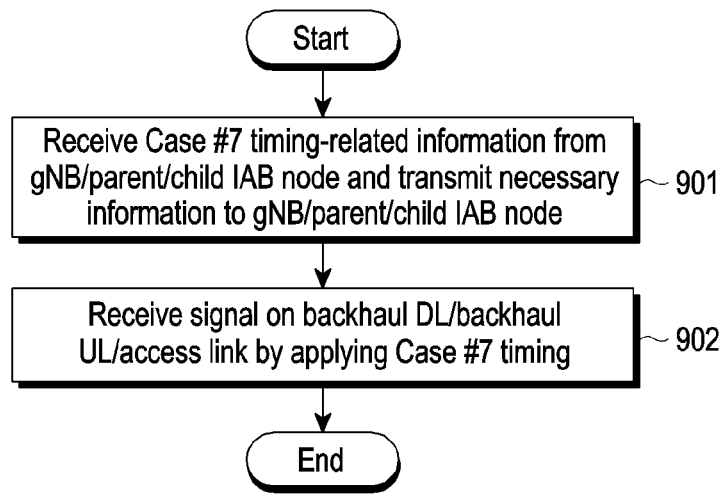
FIG. 9 is a flowchart illustrating an operation of an IAB node in a wireless communication system according to an embodiment of the present disclosure.

FIG. 9 is a flowchart illustrating an operation of an IAB node in a wireless communication system according to an embodiment of the present disclosure.

Referring to FIG. 9, in operation 901, IAB2 702 of FIG. 7 receives Case #7 timing-related information to IAB1 701 being the gNB/parent IAB node or IAB3 703 being the child IAB node in FIG. 7 and transmits necessary information to IAB1 701 or IAB3 703, according to the embodiment of the present disclosure described in FIG. 7. In operation 902, IAB2 702 receives a signal from IAB1 701 on the backhaul DL by applying the Case #7 timing and receives a signal from IAB3 703 on the backhaul DL or from an access UE on an access DL, according to the embodiment of the present disclosure described with reference to FIG. 7.

Figure 10:
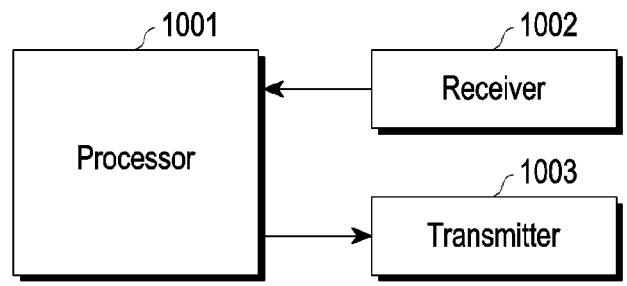
FIG. 10 is a block diagram illustrating the configuration of a user equipment (UE) according to an embodiment of the present disclosure.
Figure 11:
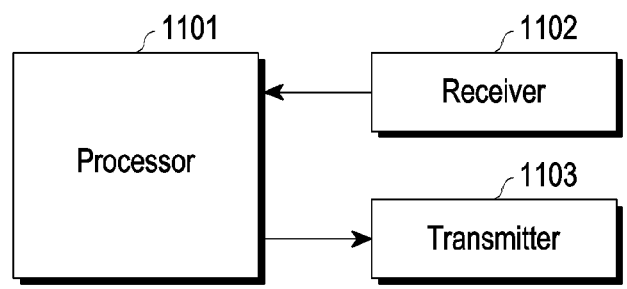
FIG. 11 is a block diagram illustrating the configuration of a gNB according to an embodiment of the present disclosure.
Figure 12:
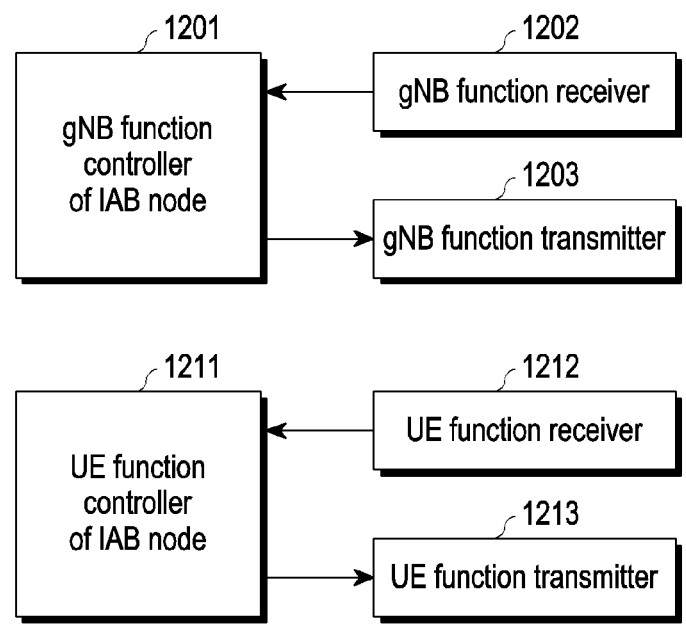
FIG. 12 is a block diagram illustrating the configuration of an IAB node according to an embodiment of the present disclosure.

To perform the above embodiments of the present disclosure, FIGS. 10 and 11 illustrate transmitters, receivers, and processors of a UE and a gNB, respectively. A transmitter and a receiver may be referred to as a transceiver. FIG. 12 also illustrates an apparatus of an IAB node. In the 5G communication system described in the above embodiments, when a signal is transmitted and received on a backhaul link or an access link through an IAB node, a method of transmitting and receiving signals by a gNB (donor gNB) that transmits and receives signals to and from an IAB node and by a UE that transmits and receives signals to and from an IAB node, have been described. To perform the methods, a transmitter, a receiver, and a processor of each of a gNB, a UE, and an IAB node may operate according to an embodiment.

FIG. 10 is a diagram illustrating the configuration of a UE according to an embodiment of the present disclosure.

Referring to FIG. 10, the UE of the present disclosure may include a processor 1001, a receiver 1002, and a transmitter 1003.

The processor 1001 may control a series of processes in which the UE may operate according to the afore-described embodiments of the present disclosure illustrated in FIGS. 1 to 8, alone or in combination. For example, the processor 1001 may differently control access link transmission and reception to and from an IAB node according to embodiments of the present disclosure. The receiver 1002 and the transmitter 1003 may be collectively referred to as a transceiver in an embodiment of the present disclosure. The transceiver may transmit and receive a signal to and from a gNB. The signal may include at least one of control information or data. To this end, the transceiver may include an RF transmitter for up-converting and amplifying the frequency of a transmission signal, and an RF receiver for low-noise-amplifying and down-converting a received signal. Further, the transceiver may receive a signal on a radio channel and output the received signal to the processor 1001, and transmit a signal received from the processor 1001 on a radio channel.

FIG. 11 is a diagram illustrating the configuration of a gNB (donor gNB) according to an embodiment of the present disclosure.

Referring to FIG. 11, the gNB of the present disclosure may include a processor 1101, a receiver 1102, and a transmitter 1103.

The processor 1101 may control a series of processes in which the gNB operates according to the embodiments of the present disclosure of FIGS. 1 to 8 described above, alone or in combination. For example, the processor 1101 may differently control backhaul link transmission and reception and access link transmission reception to and from an IAB node according to embodiments of the present disclosure. The receiver 1102 and the transmitter 1103 may be collectively referred to as a transceiver in the embodiment of the present disclosure. The transceiver may transmit/receive a signal to/from a UE or a (child) IAB node. The signal may include at least one of control information or data. To this end, the transceiver may include an RF transmitter for up-converting and amplifying the frequency of a transmission signal, and an RF receiver for low-noise-amplifying and down-converting a received signal. In addition, the transceiver may receive a signal on a radio channel and output the received signal to the processor 1101, and transmit a signal received from the processor 1101 on a radio channel.

FIG. 12 is a diagram illustrating the configuration of an IAB node according to an embodiment of the present disclosure.

Referring to FIG. 12, the IAB node of the present disclosure may include a gNB function controller 1201, a gNB function receiver 1202, and a gNB function transmitter 1203, for transmission and reception to and from a lower (child) IAB node on a backhaul link. Further, the IAB node may include a UE function controller 1211, a UE function receiver 1212, and a UE function transmitter 1213, for initial access to a higher (parent) IAB node and/or a donor gNB, transmission and reception of a higher-layer signal before transmission and reception on a backhaul link, and transmission and reception to and from the higher (parent) IAB node and the donor gNB on a (radio) backhaul link.

The gNB function controller 1201 of the IAB node may control a series of processes in which the IAB node operates like a gNB according to the embodiment of the present disclosure. For example, the gNB function controller 1201 may perform the function of the DU of an IAB node as described before. For example, the gNB function controller 1201 may differently control transmission and reception to and from a lower IAB node on a backhaul link and transmission and reception to and from a UE on an access link. The gNB function receiver 1202 and the gNB function transmitter 1203 may be collectively referred to as a first transceiver in the embodiment of the present disclosure.

The first transceiver may transmit/receive a signal to/from a UE or a lower (child) IAB node. The signal may include at least one of control information or data. To this end, the first transceiver may include an RF transmitter for up-converting and amplifying the frequency of a transmission signal, and an RF receiver for low-noise-amplifying and down-converting a received signal. In addition, the first transceiver may receive a signal on a radio channel and output the received signal to the gNB function processor 1201, and transmit a signal received from the gNB function processor 1201 on a radio channel.

The UE function controller 1211 of the JAB node may control a series of processes in which a lower (child) JAB node may operate like a UE, for data transmission and reception to and from a donor gNB or a higher (parent) JAB node according to the embodiment of the present disclosure. For example, the UE function controller 1211 may perform the function of the MT of an JAB node as described before. For example, the UE function controller 1211 may differently control transmission and reception to and from the donor gNB and/or the higher (parent) JAB node on a (radio) backhaul link. The UE function receiver 1212 and the UE function transmitter 1213 may be collectively referred to as a second transceiver in the embodiment of the present disclosure.

The second transceiver may transmit and receive a signal to and from the donor gNB and the higher JAB node. The signal may include at least one of control information or data. To this end, the second transceiver may include an RF transmitter for up-converting and amplifying the frequency of a transmission signal, and an RF receiver for low-noise-amplifying and down-converting a received signal. In addition, the second transceiver may receive a signal on a radio channel and output the received signal to the UE function processor 1211, and transmit a signal received from the UE function processor 1211 on a radio channel.

The gNB function controller 1201 of the JAB node and the UE function controller 1211 of the IAB node, included in the IAB node in FIG. 12, may be integrated as an IAB node controller. In this case, the IAB node controller 1200 may control the functionalities of the DU and the MT together in the IAB node. The gNB function controller 1201, the UE function controller 1211, and the IAB node controller may be implemented as at least one processor. The first transceiver and the second transceiver may be provided separately or as one integrated transceiver.

The embodiments of the present disclosure disclosed in the specification and the drawings are intended to provide specific examples to easily describe the technical idea and help the understanding of the present disclosure, not limiting the scope of the present disclosure. That is, it is apparent to those skilled in the art that other modification examples can be implemented based on the present disclosure. Further, the embodiments may be implemented in combination, when needed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an integrated access and backhaul (IAB) node in a wireless communication system, the IAB node including an IAB-mobile termination (MT) used to connect with a parent IAB node and an IAB-distributed unit (DU) used to connect with a child IAB node, the method comprising:
    identifying information on a number of guard symbols associated with switching between two timing cases among a first timing case, a second timing case, and a third timing case;
    transmitting, to the child IAB node, information indicating the first timing case to be applied to a specific slot for the child IAB node among the first timing case, the second timing case, and the third timing case, and resource configuration information including information on the specific slot for the child IAB node, the specific slot with a slot format including at least one of downlink symbols, uplink symbols, or flexible symbols;
    transmitting, to the child IAB node, a timing advance (TA) related offset value of uplink transmission timing to be applied for the child IAB node by a higher layer signaling, the TA related offset value being associated with the first timing case; and
    receiving, from the child IAB node, a signal based on the first timing case, the TA related offset value, and the information on the number of guard symbols.

2. The method of claim 1, wherein transmitting, to a child IAB node, information indicating the first timing case comprises transmitting, to the child IAB node, the information indicating the first timing case using a medium access control (MAC) signal, and
    wherein the first timing case corresponds to a timing case in which a reception timing of the IAB MT coincides with a reception timing of the IAB DU.

3. The method of claim 1, wherein the signal received from the child IAB node is a signal for which an uplink timing advance is applied based on the TA related offset value.

4. The method of claim 2, further comprising:
    receiving, from the parent IAB node, information on subcarrier spacing associated with the number of guard symbols required for switching between the two timing cases among the first timing case, the second timing case, and the third timing case; and
    performing a switching operation between the two timing cases,
    wherein the second timing case corresponds to a timing case using a TA applied for an uplink transmission of the IAB-MT based on information on the TA received from the parent IAB node, and wherein the third timing case corresponds to a timing case in which a transmission timing of the IAB MT coincides with a transmission timing of the IAB DU.

5. The method of claim 4, wherein the subcarrier spacing is configured for the IAB node that transitions between the IAB-MT and the IAB-DU.

6. The method of claim 1, wherein the first timing case corresponds to a timing case in which a reception timing of the IAB MT coincides with a reception timing of the IAB DU,
wherein the second timing case corresponds to a timing case using a TA applied for an uplink transmission of the IAB-MT based on information on the TA received from the parent IAB node, and
wherein the third timing case corresponds to a timing case in which a transmission timing of the IAB MT coincides with a transmission timing of the IAB DU.

7. An integrated access and backhaul (IAB) node in a wireless communication system, the IAB node including an IAB-mobile termination (MT) used to connect with a parent IAB node and an IAB-distributed unit (DU) used to connect with a child IAB node, the IAB node comprising:
at least one transceiver; and
a controller coupled with the at least one transceiver and configured to:
identify information on a number of guard symbols associated with switching between two timing cases among a first timing case, a second timing case, and a third timing case,
transmit, to the child IAB node, information indicating the first timing case to be applied to a specific slot for the child IAB node among the first timing case, the second timing case, and the third timing case, and resource configuration information including information on the specific slot for the child IAB node, the specific slot with a slot format including at least one of downlink symbols, uplink symbols, or flexible symbols,
transmit, to the child IAB node, a timing advance (TA) related offset value of uplink transmission timing to be applied for the child IAB node by a higher layer signaling, the TA related offset value being associated with the first timing case; and
receive, from the child IAB node, a signal based on the first timing case, the TA related offset value, and the information on the number of guard symbols.

8. The IAB node of claim 7, wherein the controller is configured to transmit the information indicating the first timing case using a medium access control (MAC) signal, and
wherein the first timing case corresponds to a timing case in which a reception timing of the IAB MT coincides with a reception timing of the IAB DU.

9. The IAB node of claim 7, wherein the signal received from the child IAB node is a signal for which an uplink timing advance is applied based on the TA related offset value.

10. The IAB node of claim 8, wherein the controller is further configured to:
receive, from the parent IAB node, information on subcarrier spacing associated with the number of guard symbols required between the two timing cases among the first timing case, the second timing case, and the third timing case; and
perform a switching between the two timing cases,
wherein the second timing case corresponds to a timing case using a TA applied for an uplink transmission of the IAB-MT based on information on the TA received from the parent IAB node, and
wherein the third timing case corresponds to a timing case in which a transmission timing of the IAB MT coincides with a transmission timing of the IAB DU.

11. The IAB node of claim 10, wherein the subcarrier spacing is configured for the IAB node that transitions between the IAB-MT and the IAB-DU.

12. The IAB node of claim 7, wherein the first timing case corresponds to a timing case in which a reception timing of the IAB MT coincides with a reception timing of the IAB DU,
wherein the second timing case corresponds to a timing case using a TA applied for an uplink transmission of the IAB-MT based on information on the TA received from the parent IAB node, and
wherein the third timing case corresponds to a timing case in which a transmission timing of the IAB MT coincides with a transmission timing of the IAB DU.

13. A method of a child integrated access and backhaul (IAB) node connected with an IAB node in a wireless communication system, the child IAB node including an IAB-mobile termination (MT) used to connect with to the IAB node, the method comprising:
identifying information on a number of guard symbols associated with switching between two timing cases among a first timing case, a second timing case, and a third timing case;
receiving, from the IAB node, information indicating the first timing case to be applied to a specific slot for the child IAB node among the first timing case, the second timing case, and the third timing case, and resource configuration information including information on the specific slot for the child IAB node, the specific slot with a slot format including at least one of downlink symbols, uplink symbols, or flexible symbols;
receiving, from the IAB node, a timing advance (TA) related offset value of uplink transmission timing to be applied for the child IAB node by a higher layer signaling, the TA related offset value being associated with the first timing case; and
transmitting, by the IAB-MT in the child IAB node, a signal to the IAB node based on the first timing case, the TA related offset value, and the information on the number of guard symbols.

14. The method of claim 13, wherein receiving, from the IAB node, information indicating the first timing case comprises receiving, from the IAB node, the information indicating the first timing case using a medium access control (MAC) signal, and
wherein the first timing case corresponds to a timing case in which a reception timing of an IAB MT in the IAB node coincides with a reception timing of an IAB DU in the IAB node.

15. The method of claim 14, wherein the IAB-MT in the child IAB node transmits the signal for which an uplink timing advance is applied based on the TA related offset value.

16. A child integrated access and backhaul (IAB) node connected with an IAB node in a wireless communication system, the child IAB node including an IAB-mobile termination (MT) used to connect with to the IAB node, the child IAB node comprising:
at least one transceiver; and
a controller coupled with the at least one transceiver and configured to:

identify information on a number of guard symbols associated with switching between two timing cases among a first timing case, a second timing case, and a third timing case, receive, from the IAB node, first information indicating a timing case to be applied to a specific slot for the child IAB node among the first timing case, the second timing case, and the third timing case, and resource configuration information including information on the specific slot for the child IAB node, the specific slot with a slot format including at least one of downlink symbols, uplink symbols, or flexible symbols, receive, from the IAB node, a timing advance (TA) related offset value of uplink transmission timing to be applied for the child IAB node by a higher layer signaling, the TA related offset value being associated with the first timing case, and transmit, by the IAB-MT in the child IAB node, a signal to the IAB node based on the first timing case, the TA related offset value, and the information on the number of guard symbols.

17. The child IAB node of claim 16, wherein the controller is configured to receive the information indicating the first timing case using a medium access control (MAC) signal, and wherein the first timing case corresponds to a timing case in which a reception timing of an IAB MT in the IAB node coincides with a reception timing of an IAB DU in the IAB node.

18. The child IAB node of claim 17, wherein the IAB-MT in the child IAB node transmits the signal for which an uplink timing advance is applied based on the TA related offset value.

* * * * *